Aug. 26, 1969 L. S. TAYLOR ET AL 3,463,843
METHOD OF MAKING A FLOAT FOR A LIQUID LEVEL GAUGE
Filed Sept. 28, 1965 3 Sheets-Sheet 1
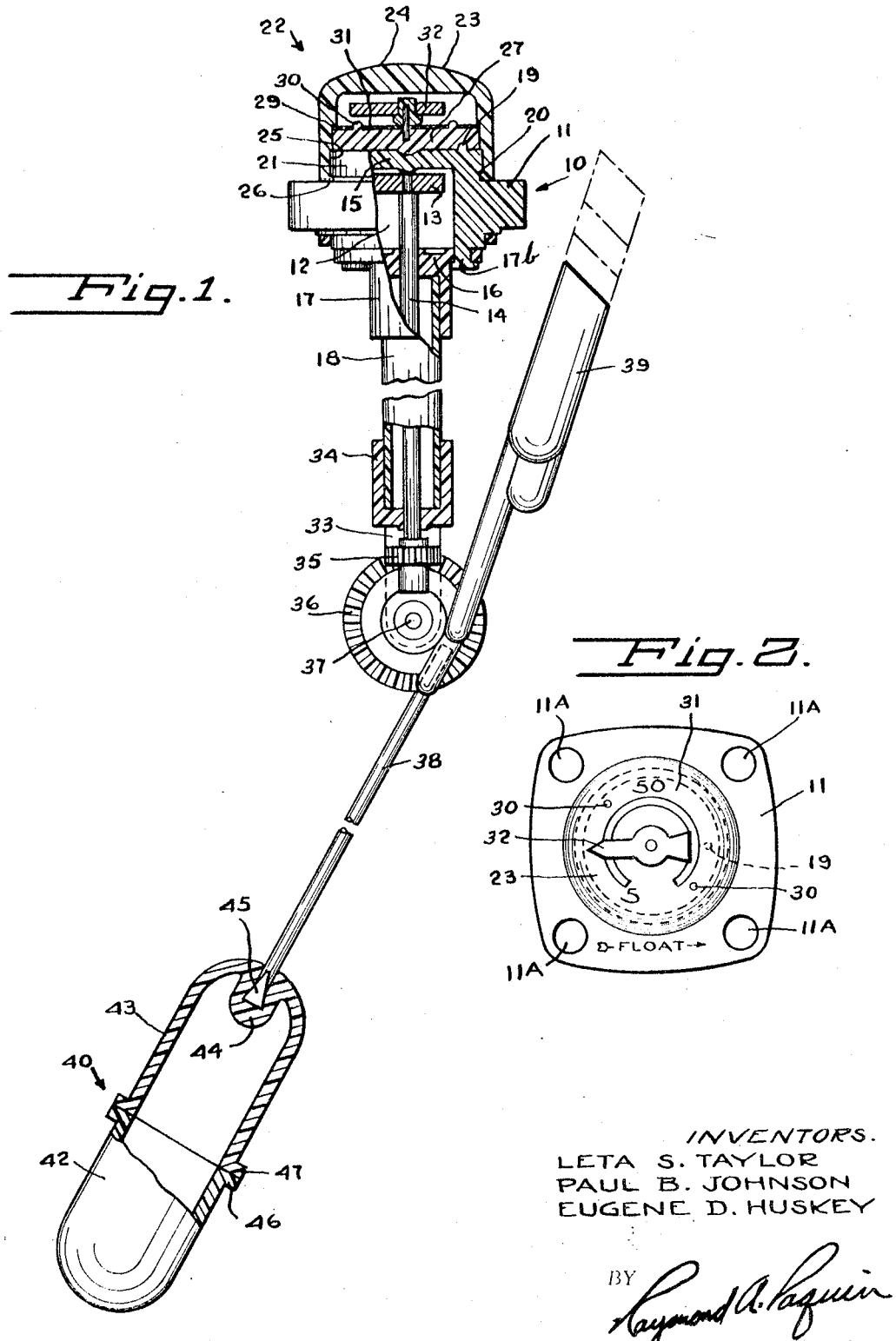
INVENTORS.
LETA S. TAYLOR
PAUL B. JOHNSON
EUGENE D. HUSKEY
BY
Raymond A. Paquin
ATTORNEY.

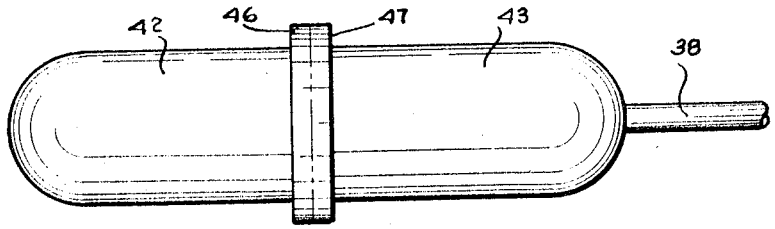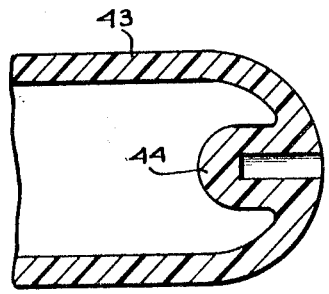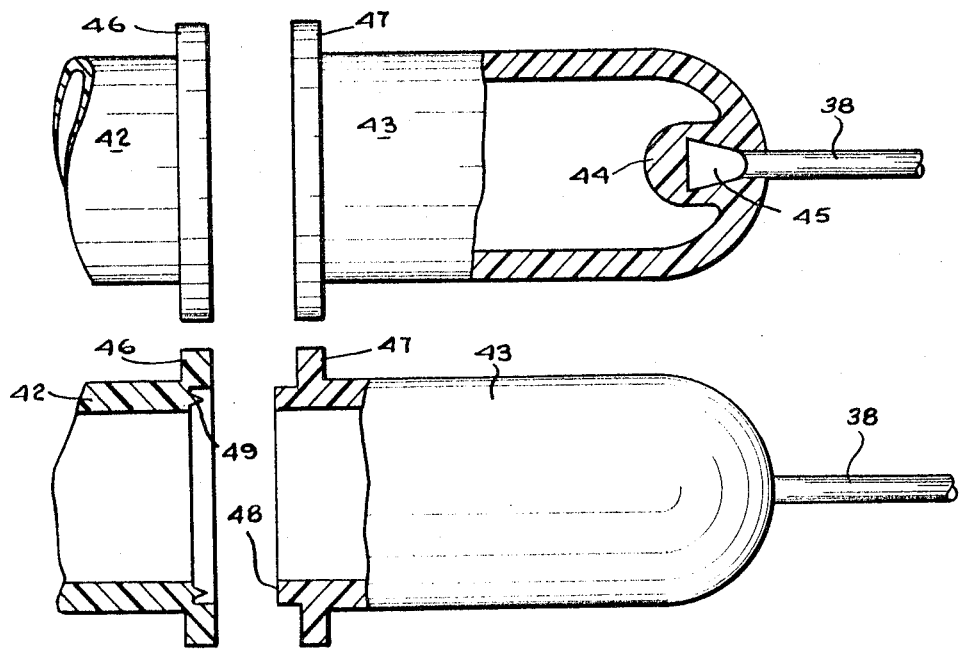

Aug. 26, 1969   L. S. TAYLOR ETAL   3,463,843
METHOD OF MAKING A FLOAT FOR A LIQUID LEVEL GAUGE
Filed Sept. 28, 1965   3 Sheets-Sheet 3

INVENTORS.
LETA S. TAYLOR
PAUL B. JOHNSON
EUGENE D. HUSKEY

BY Raymond A. Paquin
ATTORNEY.

United States Patent Office 3,463,843
Patented Aug. 26, 1969

3,463,843
METHOD OF MAKING A FLOAT FOR A
LIQUID LEVEL GAUGE
Leta S. Taylor, Paul B. Johnson, and Eugene D. Huskey, all c/o J. Y. Taylor Mfg. Co., Garland, Tex. 75040
Filed Sept. 28, 1965, Ser. No. 490,998
Int. Cl. B29c 27/08
U.S. Cl. 264—68                    1 Claim

ABSTRACT OF THE DISCLOSURE

The process of making a hollow float body of thermoplastic material for a liquid level gauge including the provision of a sharp edge narrow circular ridge of the thermoplastic material on one element and a flat circular surface on the other element for forming a spin welded joint.

---

This invention relates to liquid level gauges and has particular reference to a new and improved float for liquid level gauges and the process of making same, which gauge is of the type adapted for use with storage tanks containing fluids of liquified gases stored under pressure such as butane and propane.

An object of the invention is to provide a new and improved float arrangement for liquid level gauges of the type set forth which is simpler and more economical in construction, yet efficient in operation.

Another object is to provide a new and improved float arrangement of the type set forth which allows its use in a greater range of fluids without damage to the gauge components than prior type gauges.

Another object is to provide a new and improved float arrangement which may be adapted for use with various storage tanks and/or fluids or liquified gases.

Another object is to provide a new and improved effective one-piece float arrangement for a liquid level gauge, which float is adapted to withstand the internal pressures of gases in such tanks, and which float is relatively simple and economical in construction but will also resist chemical reaction from the liquified gases or liquids in the tank, and which enables its uses in a greater range of liquids.

Another object is to provide a float for a liquid level gauge wherein the parts normally subject to wear are made of a material which is wear resistant.

Another object is to provide a new and improved process of making a float for a liquid level gauge and for assembling said float.

Another object is to provide a new and improved process of assembling the components of a float for a liquid level gauge to obtain an effectively unitary connection between the components.

Other objects and advantages of the invention will be apparent from the following description taken in connection with the accompanying drawings wherein a preferred form of the invention and process are given by way of illustration only.

Referring to the drawings:

FIG. 1 is a side view, partially in section, of liquid level gauge embodying a float made according to the invention;

FIG. 2 is a top or plan view of the gauge head and indicator head of the guage shown in FIG. 1;

FIG. 3 is a side view of a float made according to the invention;

FIG. 4 is a partial sectional view of one float section;

FIG. 5 is a side view, partially in section, illustrating the making of the float;

FIG. 6 is a fragmentary sectional view illustrating one method of connecting the sections of the float of the invention;

Figure 7:
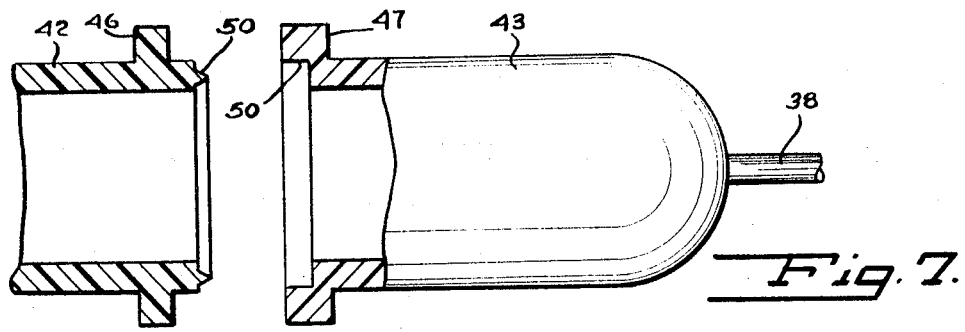
FIG. 7 is a view similar to FIG. 6 but illustrating another form of connection of the sections of the float of the invention.

Referring more particularly to the drawings wherein similar reference characters designate corresponding parts throughout the several views, the liquid level gauge shown in FIG. 1 embodying the invention comprises a gauge head designated generally at 10, having the rim 11 through which are provided openings 11A for bolts or other suitable fastening means for securing the gauge head 10 in operative position over an opening in the storage tank. Gauge head 10 may be cast or molded of suitable plastic material as hereinafter set forth or die cast of aluminum or zinc depending upon the use intended.

Gauge head 10 is provided with chamber 12 for drive magnet 13 which is rigidly secured on the upper end of rotatably mounted shaft 14, whereby pivotal movement or rotation of shaft 14 effects simultaneous rotation or pivotal movement of drive magnet 13. Shaft or rod 14 may be of stainless steel or of chemically resistant plastic as hereinafter specified.

The upper end of gauge head 10 is closed or sealed by wall 15 which is formed integral with gauge head 10.

The lower side of chamber 12 is closed by the upper wall of adapter 16 which is formed with integral hollow or tubular connector portion 17 depending therefrom to which is secured the upper end of tubular riser 18 which is in telescoping relation with connector portion 17 and secured thereto by bonding or staking. Adapter 16 has an opening for rod or shaft 14.

Connector or adapter 16 with tubular portion 17 is molded or cast of chemical resistant plastic as hereinafter specified.

Gauge head 10 is formed with depending projecting portions 17b extending through openings in adapter 16 and which have their heads enlarged to retain the parts in assembled relation.

The locating lug 19 is provided on the upper surface of wall 15 which wall is also provided with a central recess on its upper side and peripheral groove 20 which is formed beneath peripheral flange 21.

The indicator head designated generally at 22 comprises gauge head crystal 23 which is molded or cast of clear, colorless, transparent plastic or other material such as glass, and may include a portion having curved surface contours 24 of such curvature as to provide desired magnification in such portion to facilitate the reading or viewing of the indications on the dial.

Gauge head crystal 23 is provided with the peripheral groove 25 adapted to fit over peripheral flange 21 and may be secured thereto by suitable adhesive with rim or lug 26 positioned in peripheral groove 21 whereby the entrance of moisture or dust or the like into indicator head 22 is prevented.

Within indicator head 22 is provided dial plate 27 which has recesses in its lower surface for receiving locating lugs 19 to properly orient indicator head 22 on gauge head 10 and said dial plate 27 also may have a central offset portion 28 adapted to be positioned in the recess in the upper surface of wall 15.

Dial plate 27 is preferably made by molding or casting of suitable plastic or other material and secured in desired position in indicator head 22 against flange 29 by suitable bonding material or adhesive.

To locate the indicator head in desired or predetermined position on the gauge head there are provided on the upper surface of dial plate 27, the locating lugs 30 adapted to be positioned in corresponding openings in dial face 31 which may be formed of suitable metal such as aluminum or of other desired material such as molded or cast plastic and this dial face is provided with suitable indica thereon whereby magnetic pointer 32 indicates on such dial face 31 the contents of the storage tank. Pointer 32 is carried by a pointer hub which in turn is mounted for pivotal movement on a pivot which is carried by dial plate 27.

The gauge head 10 is formed by casting or molding of suitable plastic material or die cast of aluminum zinc or other material depending upon the use to be made of the gauge.

Indicator head 22, including crystal 23, dial plate 27, dial face 31, pointer 32, the pointer pin and hub are assembled to form a single self-contained and sealed indicator head which is pressed on to the gauge head and secured thereto by engagement of the rim or lug on the indicator head into the retaining groove in the gauge head.

The cast or molded plastic fork 33 has the tubular portion 34 adapted to receive the end of riser 18 and be secured thereto by staking or bonding by suitable chemical dependent upon the plastic material of which the fork 33 and riser 18 are constructed.

Shaft 14 has its end portion extending through an opening in the wall of fork 33 and on the end of said shaft 14 is positioned driven gear 35 which is formed of cast or molded plastic and either pinned to the drive shaft 14 or formed thereon in the cast of a metal drive shaft or formed integral therewith in the case of a plastic drive shaft. The driven gear 35 is preferably formed of wear resistant material such as nylon.

The drive gear 36 is pivotally mounted on pivot 37 in fork 33. This drive gear 36 is preferably formed of wear resistant material such as nylon and meshes with driven gear 35 to thereby pivot drive shaft 14. Float rod 38 and counterweight 39 may be a metal rod cost or molded to gear 36 which rod can be plastic coated to render them more resistant to chemical reaction, or they can be of plastic and cast or molded integral with drive gear 36.

The float 40 is molded or cast of chemical resistant plastic as hereinafter set forth and is secured to float rod 38, as hereinafter described where such rod is of metal or it can be cast or molded thereon or molded integral therewith if said rod 38 is made of plastic.

The mold 40 is formed of two molded plastic sections 42 and 43 which are molded of chemically resistant plastic as hereinafter set forth.

Float section 43 is adapted to be connected to float rod 38 and for this reason has the internal reinforcement or projection 44 adapted to receive the wedge shaped end 45 of float rod 38, to connect the float 40 to the float 40 to the float rod 38.

The float sections 42 and 43 have the integral peripheral flanges 46 and 47, respectively, adjacent their free or open ends. In the form of FIG. 6, float section 43 has flange spaced from its open end and its end face 48 is flat and section 42 has its end face adjacent flange 46 provided with tongue or projection 49 in its end face inwardly of the end of flange 46 and adapted to engage surface 48 on section 43.

The float sections 42 and 43 are united into an effectively integral fluid tight float construction by spin welding or ultrasonic welding of tongue 49 on surface 48 whereby the flanges 46 and 47 are in abutting relation and the parts 42 and 43 are united into an effectively integral construction.

The end of float rod 38 is then secured in the reinforced end 44 of float section 43 to connect float 40 to the float rod.

In FIG. 7 is shown a modified form of the invention in which flange 46 is spaced from the end of section 42 and section 42 has a tongue 40 on its end and section 43 is formed with an annular recess 51 within flange 47 adapted to surround the projecting end of section 42.

Figure 8:
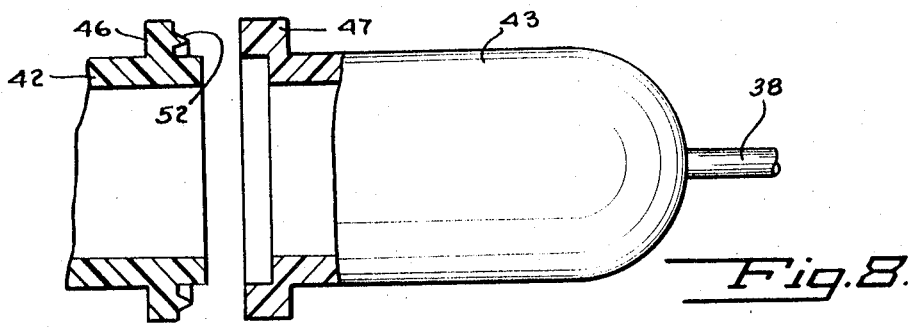
FIGS. 8, 9 and 10 are views generally similar to FIGS. 6 and 7 but illustrating modified arrangements of connecting means for the float sections.

In the form of the invention of FIG. 8, the flange 46 is provided spaced from the end of section 42 and section 43 is similar to section 43 in FIG. 7. In this form, flange 46 is provided with tongue 52 adapted to engage flange 47 on section 43.

The flanges 46 and 47 are united by spin welding or plastic electronic welding to unite the flanges as previously described.

Figure 9:
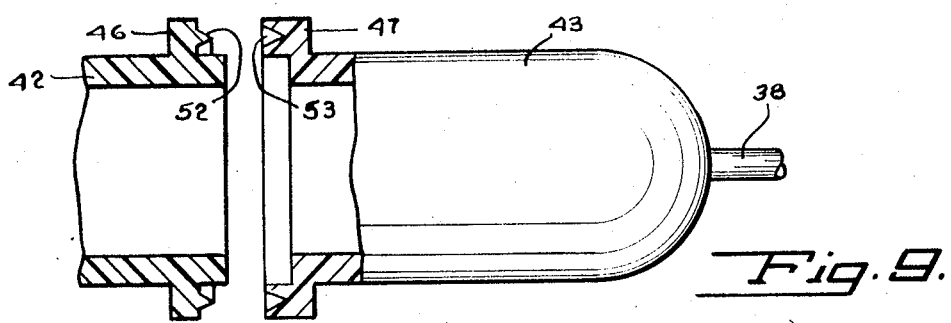

The form of the invention shown in FIG. 9 is similar to that of FIG. 8 except that flange 47 has the annular groove or recess 53 to receive tongue 52 to improve the joining of the sections.

Figure 10:
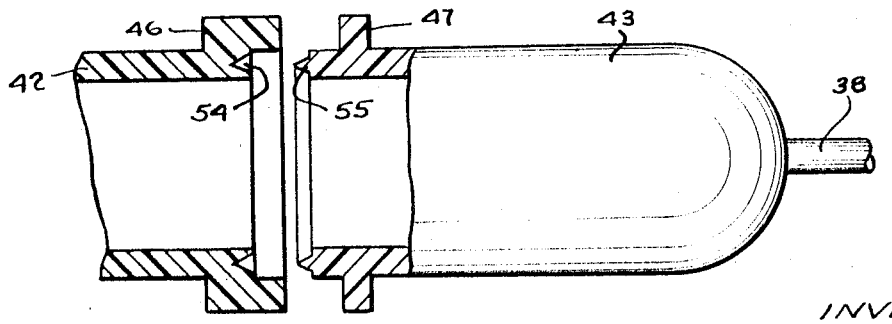

The form of the invention shown in FIG. 10 is similar to that of FIG. 7 except that the annular groove or recess 54 is provided for the tongue or projection 55 to improve the joining of the sections. In this form the projection 55 has been shown on float section 43 and has merely been shown in reversed relation compared to the showing of FIG. 7.

Counterweight 39 can be made of desired weight by controlling the size or material of which it is constructed or it can be formed of plastic coated metal. It is preferable that the unitary drive gear, counterweight, float arm and float be molded or cast as stated above to simplify and reduce the cost of manufacture thereof.

In the manufacture of the liquid level gauge of this invention, the gauges head 10 may be formed of die cast metal such as aluminum or zinc or molded or cast of a plastic having sufficient strength such as nylon or an acrylonitrile-butadiene-styrene composition which is relatively stable, tough, hard and rigid, and withstands acids and pressure and resists weather.

Other plastics which might be employed depending upon the material with which the gauge is to be used are polycarbonates, polystyrenes, acrylics, vinyls or others with suitable properties.

Other parts, such as the indicator head, connector riser, fork, drive rod, and drive gears may also be formed of such plastic materials.

Drive magnet 13 and the end of shaft 14 are then placed in chamber 12 in gauge head 10 with shaft 14 extending through the opening in the wall of connector 16 to which connector 16 the end of riser 18 is secured as stated above.

Fork 33 is then secured on the end of riser 18 by staking or by bonding or by suitable adhesive to connect tubular portion 34 of fork 33 to the end of riser 18, with shaft 14 extending therethrough.

The unit consisting of drive gear 36, float rod 38, float 40 and counterweight 39 is then mounted on fork 33 by pivot pin 37 with gears 35 and 36 in meshing relation.

When gear 35 is formed integral with shaft 14 it will be necessary to mount fork 33, riser 18 and connector 16 together as a unit before mounting drive magnet 13 on shaft 14 and then connecting this assembly to gauge head 10 as previously described.

The indicator head, which is formed as a unit, as described above is mounted on the upper side of gauge head 10 to complete the assembly.

As shown in the drawings, a suitable gasket is provided between the gauge head 10 and the storage tank to seal this connection.

From the foregoing it will be seen that we have provided new and improved means and process for obtaining all of the objects and advantages of the invention.

We claim:

1. The process of making a hollow float body of thermoplastic material for a liquid level gauge comprising forming two sections of said hollow float body presenting broad flat circular surfaces toward each other, one of said broad flat surfaces being interrupted by a sharp edged narrow ridge of said thermoplastic material, concentric to said surface to contact said broad flat uninterrupted surface of said other section, welding by pressing said ridge against the broad flat surface of said other section and rotating said sections whereby said sharp edged narrow ridge of thermoplastic material and a narrow portion of said other section are quickly raised to a temperature at which the thermoplastic material becomes plastic, and whereby the merging of the thermoplastic material of said two sections commences at said narrow ridge and progresses radially both outwardly and inwardly therefrom across said broad flat surfaces.

References Cited

UNITED STATES PATENTS

| | | | |
|---|---|---|---|
| 2,884,835 | 5/1959 | Rupert | 264—68 X |
| 3,002,870 | 10/1961 | Belgarde et al. | 156—73 X |
| 3,120,570 | 2/1964 | Kennedy et al. | 264—68 X |
| 2,942,748 | 6/1960 | Anderson | 156—73 X |
| 3,161,330 | 12/1964 | Sagarin et al. | 29—470.3 X |
| 2,681,296 | 6/1954 | Dobbs et al. | 219—10.53 X |
| 2,804,559 | 8/1957 | Brewer | 29—463 X |
| 3,002,871 | 10/1961 | Tramm et al. | 29—470.3 X |
| 3,062,695 | 11/1962 | Hull | 29—470.3 X |
| 3,142,601 | 7/1964 | Polk et al. | 219—10.53 X |
| 3,144,710 | 8/1964 | Hollander et al. | 29—470.3 |
| 3,184,353 | 5/1965 | Balamuth et al. | |
| 3,289,477 | 12/1966 | Taylor et al. | 73—322.5 |

FOREIGN PATENTS

| | | |
|---|---|---|
| 144,522 | 1/1952 | Australia. |
| 738,671 | 10/1955 | Great Britain. |

CHARLIE T. MOON, Primary Examiner

U.S. Cl. X.R.

29—463, 470.3; 73—322.5; 156—73; 219—10.53